United States Patent [19]
Sakamoto et al.

[11] Patent Number: 5,241,425
[45] Date of Patent: Aug. 31, 1993

[54] VELOCITY SENSOR

[75] Inventors: Satoshi Sakamoto; Norikatsu Inoue, both of Tokyo, Japan

[73] Assignee: Sony Corporation, Japan

[21] Appl. No.: 910,742

[22] Filed: Jul. 8, 1992

[30] Foreign Application Priority Data

Jul. 19, 1991 [JP] Japan .................. 3-203345

[51] Int. Cl.⁵ ............................................. G02B 7/02
[52] U.S. Cl. ........................................ 359/824; 310/193
[58] Field of Search .................. 359/824, 696, 697; 354/20, 400; 310/180, 183, 186, 188, 189, 193, 194, 179

[56] References Cited

U.S. PATENT DOCUMENTS 4,639,084 1/1987 Kugioka ........................... 359/824
5,078,472 1/1992 Sugawara ......................... 359/824

*Primary Examiner*—Loha Ben
*Attorney, Agent, or Firm*—Ronald P. Kananen

[57] ABSTRACT

In a velocity sensor having a coil and a stick-shaped magnet inserted into the coil and magnetized such that opposite magnetic poles are provided at opposite longitudinal ends thereof, the coil and the magnet being movable relatively, the coil is wound more at the ends than at the center thereof.

6 Claims, 4 Drawing Sheets

VELOCITY SENSOR

BACKGROUND OF THE INVENTION (1.) Field of the Invention

This invention relates to a power generating type velocity sensor for detecting a velocity, for example, the velocity of a movable lens of a camera.

(2.) Description of the Prior Art

A number of mechanisms are known for focusing or zooming operations of a camera lens system. One example of such mechanisms is illustrated in FIG. 5. As shown in the figure, a stationary lens 2 is disposed at the center of a housing 1, on which is mounted an actuator 4 having an annular magnet 3 disposed concentrically with the stationary lens 2. On the other hand, a group of movable lenses 6 is mounted on a cylindrical portion 5a central to a movable lens holding member 5, and is inserted in the actuator 4. The cylindrical portion 5a is provided thereon with a coil 7 opposed to the inner peripheral surface of the magnet 3 so that the movable lens holding member 5 is moved in the axial direction when the coil 7 is energized. The group of movable lenses 6, arranged on the same optical axis as that of the stationary lens 2, is moved to thereby achieve the desired focusing or zooming operation of the lens system.

A stick-shaped magnet 8, magnetized to have opposite magnetic poles (N and S poles) at longitudinal ends thereof, is mounted on the outer periphery of the movable lens holding member 5, parallel to the axial direction of the movable lens holding member 5. On the other hand, a cylindrical coil 9 is mounted on the housing 1 at a position facing to the magnet 8 so that the magnet 8 is moved inside the coil 9 when the movable lens holding member 5 is moved in the axial direction. The magnet 8 and the coil 9 constitute a velocity sensor 10 which detects the velocity of the movable lenses 6 based on a counter-electromotive force arising from the attendant relative movement of the magnet 8 and the coil 9.

In the velocity sensor 10 of the above type, the coil 9 has conventionally been wound in a uniform configuration, as shown in FIG. 6, so that the number of turns per unit axial length of the coil 9 is uniform throughout the axial length of the coil 9. A movement of the magnet 8, with the coil 9 kept stationary, produces a counter-electromotive force e proportional to the rate of change in the magnetic flux interlinkage (or flux linkage) $\phi$ through the coil 9. Hence $e = d\phi/dt$. The magnetic flux generated by the magnet 8 broadens, in cross section, from the longitudinal ends toward the longitudinal center of the magnet 8, as illustrated in FIG. 7. In the conventional velocity sensor 10 with a uniformly wound coil, therefore, the variation in the magnetic flux interlinkage is smaller at the ends than at the center of the coil 9. Consequently, where servo constants are so determined as to obtain an optimum output of counter-electromotive force e at the center of the coil 9, the counter-electromotive force induced during a constant-velocity movement is decreased at the ends of the coil 9, as indicated by curve a in FIG. 2, and response speed is lowered accordingly.

SUMMARY OF THE INVENTION

This invention contemplates a solution to the problems in the prior art as described above.

It is accordingly an object of this invention to provide a velocity sensor which is capable of producing a substantially constant counter-electromotive force in response to a constant-velocity movement, throughout the range of relative movement of a coil and a magnet, and is therefore capable of accurate detection of velocity.

In order to attain the above object, this invention provides an improvement in a velocity sensor having a coil and a stick-shaped magnet inserted into the coil and magnetized such that opposite magnetic poles are provided at opposite longitudinal ends thereof, the coil and the magnet being movable relatively, the improvement residing in that the coil is wound more at the ends than at the center thereof (namely, the number of turns per unit axial length of the coil is greater at the ends than at the center of the coil).

The velocity sensor of this invention, in which the coil is wound more at the ends than at the center thereof as described above, ensures that when the coil and the magnet are moved relative to each other at a fixed velocity, a substantially constant counter-electromotive force can be obtained throughout the movement. With the velocity sensor of this invention, therefore, it is possible to achieve an accurate velocity detection over the entire moving stroke under consideration.

The above, and other, objects, features and advantages of this invention will become apparent from the following description and the appended claims, taken in conjunction with the accompanying drawings.

DESCRIPTION OF THE PREFERRED EMBODIMENTS

Some preferred embodiments of this invention will now be described below with reference to the drawings.

Figure 1:
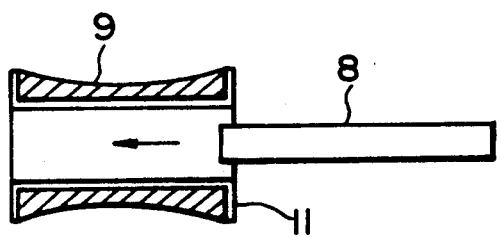
FIG. 1 is a vertical sectional view showing the construction of an essential portion of one embodiment of a velocity sensor according to this invention.
Figure 6:
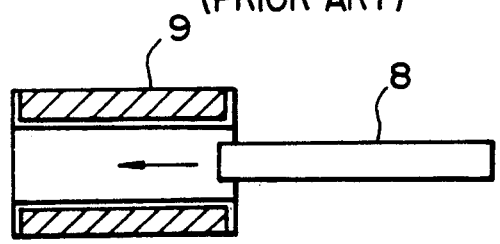
FIG. 6 is a vertical sectional view showing an essential portion of one exemplary velocity sensor according to the prior art.
Figure 7:
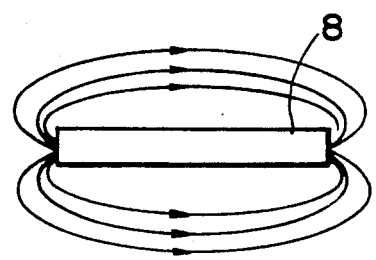
FIG. 7 is an illustration of a magnetic field produced by a magnet.

Referring to FIG. 1, there is shown the arrangement of one embodiment of this invention. The same reference characters as used for components of the prior art example shown in FIG. 6 are used also in FIG. 1 to denote the corresponding components, and explanation of such components will be omitted appropriately. This embodiment is characterized by the shape of a coil 9. The coil 9 is wound around a cylindrically shaped bobbin 11 so that the number of turns per unit axial length of the coil 9 is greater at the ends than at the center of the coil 9.

Figure 2:
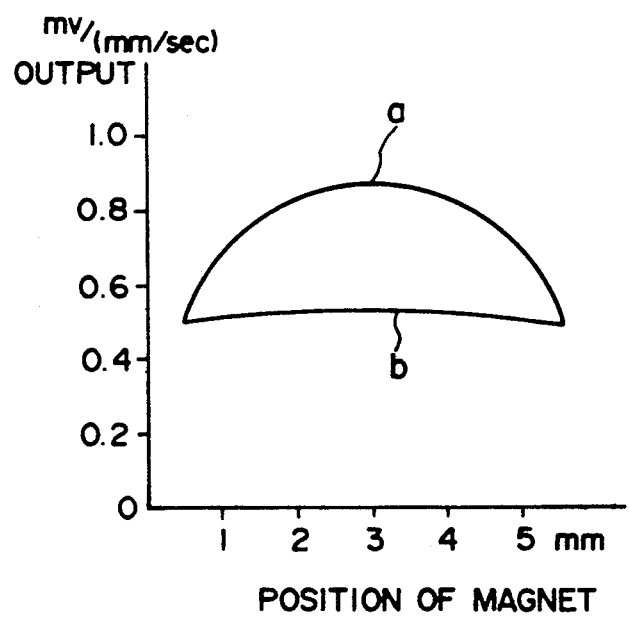
FIG. 2 is a diagram showing the relationship between the position of a magnet with respect to a coil and the counter-electromotive force induced in the case of a constant-velocity movement.

In the case of a constant-velocity movement, the coil 9 according to this embodiment produces a counter-electromotive force e (mV) which is substantially constant irrespective of what position of the coil 9 the coil-side end of the magnet 8 is located at, as indicated by curve b in FIG. 2. According to this embodiment, therefore, it is possible to perform accurate detection of velocity.

Figure 3A:
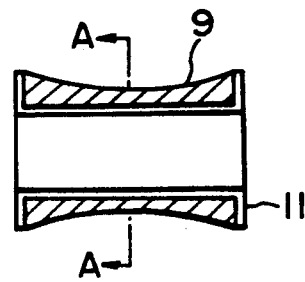
FIGS. 3A to 3D are vertical sectional views showing other embodiments of the velocity sensor according to this invention.
Figure 3B:
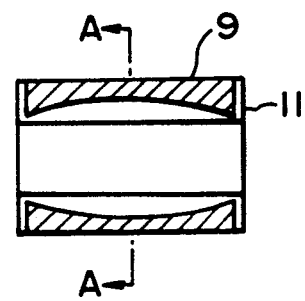
Figure 3C:
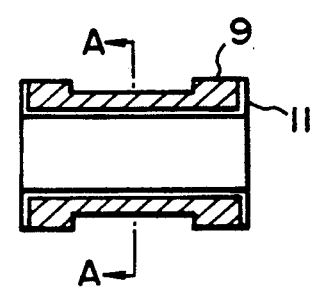
Figure 3D:
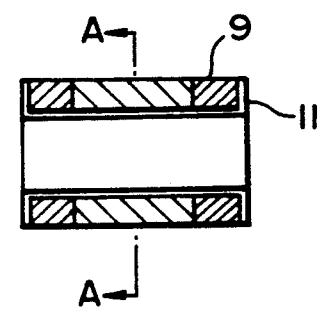
Figure 4A:
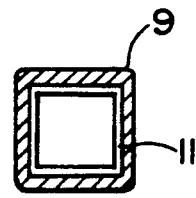
FIGS. 4A to 4D are vertical sectional views taken along line A—A of FIGS. 3A to 3D, respectively.
Figure 4B:
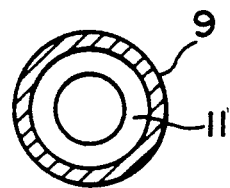
Figure 4C:
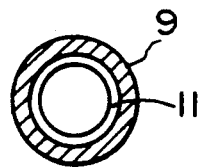
Figure 4D:
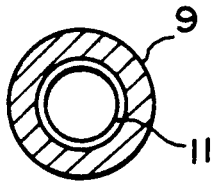
Figure 5:
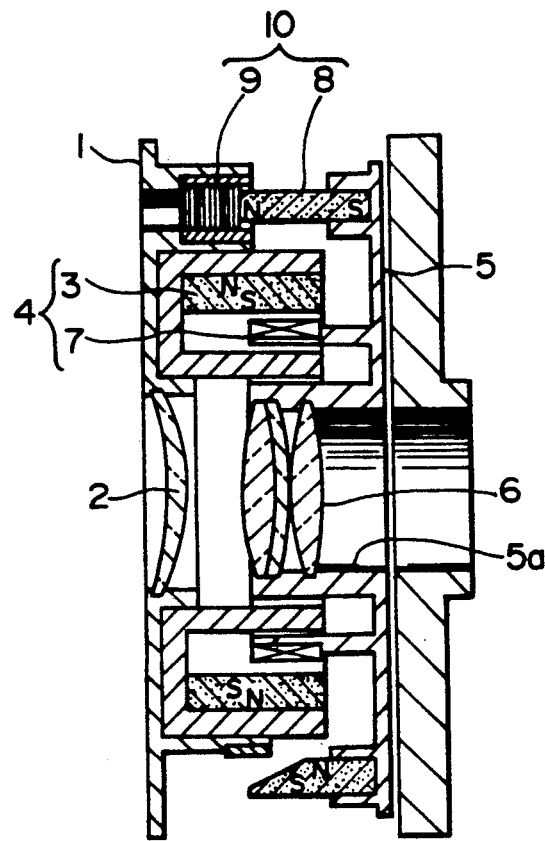
FIG. 5 is a vertical sectional view showing one example of a drive mechanism for camera lens.

Alternatively, the shape of the coil 9 may be such that the outer diameter decreases gradually from the ends to the center of the coil 9, as shown in FIG. 1. Furthermore, the coil of the velocity sensor according to this invention may have any of the shapes shown in FIGS. 3 and 4. FIGS. 3A and 4A illustrate an embodiment of this invention in which a bobbin 11 is formed in the shape of a square tube, and a coil 9 also is formed as a substantially square tube in outer configuration. In an embodiment shown in FIGS. 3B and 4B, a bobbin 11 is enlarged in outside diameter at the center thereof, whereas a coil 9 has a uniform outside diameter. FIGS. 3C and 4C shows an embodiment in which a coil 9 wound around a cylindrical bobbin 11 has a stepped configuration, with the number of turns per unit axial length of the coil 9 being greater at the ends than at an intermediate portion of the coil 9. A further embodiment is shown in FIGS. 3D and 4D, in which a relatively thinner wire is wound around the ends of a cylindrical bobbin 11 to provide a relatively greater number of turns per unit axial length, whereas a relatively thicker wire is wound around the intermediate portion of the bobbin 11 to provide a relatively smaller number of turns per unit axial length, to form a coil 9 which has a uniform outside diameter.

In each of the above embodiments, essentially the same effect as described above can be obtained.

Although the above embodiments have been described with reference to a velocity sensor for detecting the velocity of camera lens, this invention is also applicable to velocity sensors for movable parts of other devices, thereby producing essentially the same effect as above-described.

What is claimed is:

1. In a velocity sensor having a coil and a stick-shaped magnet inserted into said coil and magnetized such that opposite magnetic poles are provided at opposite longitudinal ends thereof, said coil and said magnet being movable relatively, the improvement wherein said coil is wound more at the ends than at the center thereof.

2. The velocity sensor according to claim 1, wherein said coil is wound by a relatively thicker wire at the center and is wound by a relatively thinner wire at the ends.

3. In a velocity sensor having a coil and a stick-shaped magnet inserted into said coil and magnetized such that opposite magnetic poles are provided at opposite longitudinal ends thereof, said coil and said magnet being movable relatively, the improvement wherein said bobbin is a square tube, and said coil is wound more at the ends than at the center of said bobbin.

4. In a velocity sensor having a coil and a stick-shaped magnet inserted into said coil and magnetized such that opposite magnetic poles are provided at opposite longitudinal ends thereof said coil and said magnet being movably relatively, the improvement wherein said bobbin has a larger external diameter at the center than at the ends thereof, and said coil is wound more at the ends than at the center of said bobbin.

5. A lens barrel for camera comprising:
   a movable lens holding member for being capable of moving a lens in the direction of an optical axis;
   an actuator driving said movable lens holding member; and
   a velocity sensor being disposed between a frame and said movable lens holding member and detecting velocity of a moving lens,
   said velocity sensor having a coil and a stick-shaped magnet inserted into said coil and magnetized such that opposite magnetic poles are provided at opposite longitudinal ends thereof, said coil and said magnet being movable relatively, the improvement wherein said coil is wound more at the ends than at the center thereof.

6. The lens barrel for camera according to claim 5, wherein said magnet is disposed on said movable lens holding member, and said coil is disposed on said frame.

* * * * *